United States Patent
Brown et al.

[15] 3,701,431
[45] Oct. 31, 1972

[54] REVERSE OSMOSIS APPARATUS AND METHOD FOR MAKING SAME

[72] Inventors: Barry M. Brown, Rochester; Elbert L. Ray, Penfield, both of N.Y.

[73] Assignee: Eastman Kodak Company, Rochester, N.Y.

[22] Filed: May 19, 1971

[21] Appl. No.: 144,970

[52] U.S. Cl. .................................210/321, 210/433
[51] Int. Cl. ..................................................B01d 31/00
[58] Field of Search ...............210/321, 346, 433, 486

[56] References Cited

UNITED STATES PATENTS

| | | | |
|---|---|---|---|
| 3,490,523 | 1/1970 | Esmond | 210/321 X |
| 3,616,926 | 11/1971 | Lichtenstein | 210/321 |

*Primary Examiner*—Frank A. Spear, Jr.
*Attorney*—William T. French, Robert F. Crocker and Henry M. Chapin

[57] ABSTRACT

Reverse osmosis apparatus comprises one or a plurality of reverse osmosis membrane tubes enclosed within a housing. Each tube comprises two mating rigid support forms, each having a long and narrow perforate channel therein and flat flanges extending laterally therefrom on opposite sides of the channel. Two reverse osmosis membrane sheets are clamped between the flanges, and each sheet extends into one of the channels, so that together the sheets form a tube for conducting solution. Elements of the housing can bear on the flanges with clamping pressure. A series of such tubes can be formed side-by-side in a unit. The apparatus advantageously is made by placing a flat sheet of membrane across each of first and second support forms, with or without an interposed spacer sheet, depressing the membrane into the channel by a mandrel or by applying a gas pressure differential, and then fitting the two together with the channels facing toward one another and in register. The flanges are then clamped together and the whole is enclosed in a housing in spaced relation thereto for collecting solvents. Each support form can have a series of such channels spaced from and parallel to one another.

14 Claims, 6 Drawing Figures

PATENTED OCT 31 1972 3,701,431

BARRY M. BROWN
ELBERT L. RAY
INVENTORS

BY *Howry M. Chapin*

ATTORNEY

PATENTED OCT 31 1972 3,701,431

BARRY M. BROWN
ELBERT L. RAY
INVENTORS

BY *Henry M. Chapin*

ATTORNEY

REVERSE OSMOSIS APPARATUS AND METHOD FOR MAKING SAME

BACKGROUND OF THE INVENTION

1. Field of the Invention

The present invention relates to a novel reverse osmosis apparatus, and a novel method for making such apparatus.

2. The Prior Art

Reverse osmosis membranes such as the cellulose ester membranes described in U.S. Pats. Nos. 3,522,335 and 3,527,853 have been known for some time as semipermeable membranes for separating solvents from solutions. Such membranes comprise a thin "skin" or active surface on one side thereof which is porous to the passage of water or other solvent, but not to the salt or other solute in the solution. For example, the separation of practically pure water from a solution containing salt or other solute has been accomplished by passing the impure solution through a tube formed of such a membrane; and conversely, the solution becomes more concentrated, which is sometimes the main objective. Such tubes have been found to be quite satisfactory because of their low cost, easy mechanical cleaning, and good surface-volume ratio; and also because they allow turbulent and unrestricted flow. Unfortunately, such tubes have been difficult to form, and to insert in the final apparatus assembly.

SUMMARY OF THE INVENTION

In accordance with the present invention, there has been provided a novel method for making a novel reverse osmosis apparatus comprising one or more reverse osmosis membrane tubes which are readily formed from flat sheets of membrane, and are in condition for quick and easy incorporation in the apparatus assembly.

For simplicity, the forming of a single tube will be described, but the same principles apply to the forming of multiple tubes. Generally speaking, the method comprises providing first and second identical rigid support forms, each of which has a relatively long and narrow perforated channel therein, and flat flanges extending laterally therefrom on opposite sides of the channel. The flanges and the channels of the two support forms are so constructed and arranged as to register with one another, with the channels facing toward one another.

Two reverse osmosis membrane sheets are positioned between the support forms in contact with their respective flanges and are depressed into their respective channels. Then the flanges are clamped tightly together, and the support forms and the resulting reverse osmosis membrane tube are enclosed in a housing in spaced relation thereto to provide space for collecting solvent which passes from the interior of the tube to the exterior.

The membrane sheets can be depressed into the respective channels by employing one or more removable mandrels or shafts of a material such as wood or plastic; or a gas pressure differential may be employed to force the membrane material into the channels.

A plurality of similarly formed tubes can be positioned within the housing, and can be operated individually, or can be connected together in series so that solution can be forced into an initial tube, then through one or more other tubes in series therewith, and discharged from a final tube.

The resulting reverse osmosis apparatus assembly is also part of the present invention and will be described in more detail hereinafter.

THE DRAWING

The principles of the invention will be described hereinafter with reference to the drawing, wherein.

THE PREFERRED EMBODIMENT

Figure 1:
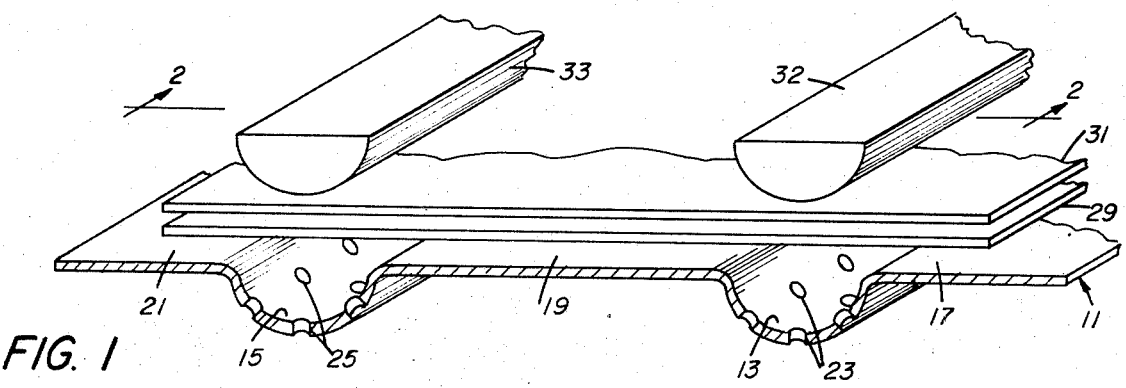
FIG. 1 is a fragmentary exploded perspective view showing elements of one-half of a reverse osmosis module in position to be assembled.
Figure 2:
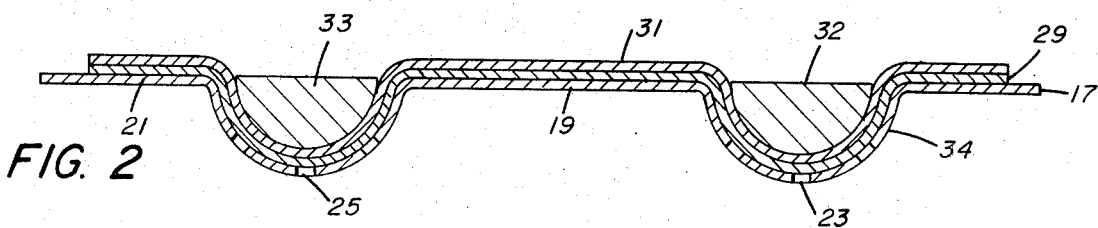
FIG. 2 is a cross-sectional view of the half module after assembly, taken along the line 2—2 in FIG. 1.

Referring to FIGS. 1 and 2, there is shown a rigid support form 11 having two relatively long and narrow concave channels 13 and 15 therein, and flat flanges 17, 19, and 21 extending laterally therefrom on opposite sides of the channels. Each channel has a plurality of holes 23 and 25 penetrating therethrough so that the channels are perforate for the flow of solvent therefrom. Support form 11 can be constructed of any material strong enough to withstand high pressures; for example, a synthetic resin such as polystyrene, fiberglass bonded with epoxy resin, or a metal.

A flat spacer sheet 29 of porus flexible material, such as cotton or nylon cloth, or woven fiberglass, is adapted to be positioned on the flanges, and a flat flexible semipermeable reverse osmosis membrane sheet 31 is adapted to be positioned on top of the spacer sheet with its active surface concave so as to be on the inside of the finished tube. Both sheets can be depressed together into the channels 13 and 15 by applying generally semi-cylindrical mandrel or shaft members 32 and 33 thereto, forming an assembled half unit 34 as shown in FIG. 2. Spacer sheet 29 is optional for conducting liquid to the perforations 23 and 25, and can be dispensed with when perforate support form 11 is constructed of a porous material, such as sintered metal powder. To assure that undue stretching or rupture of the membrane sheet does not occur, the technician should avoid applying excessive force, for example, by applying the mandrels one at a time, and/or pressing the membrane into the channels by hand gently.

A second identical half unit 36 is made up in the same way, and is positioned on top of the first half unit 34 with the flanges and channels in register with one another, and with the concave channels facing toward one another so as to create a tube. Adhesive material may be applied to the juxtaposed flat areas of the membranes to prevent cross leakage when in use.

Figure 3:
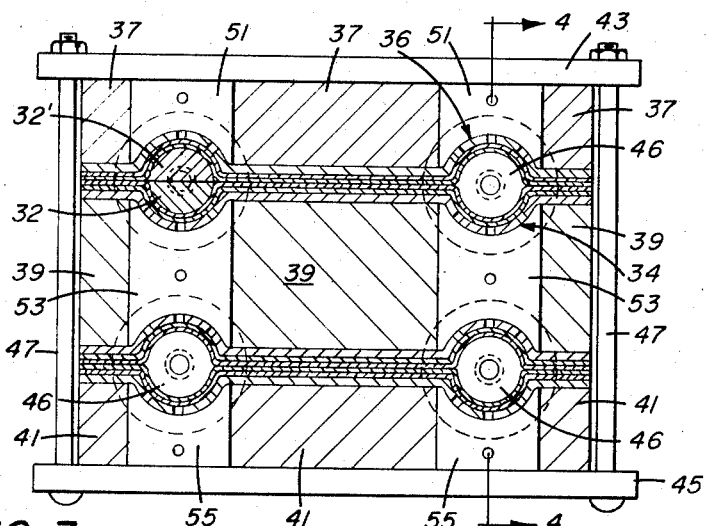
FIG. 3 is a vertical sectional view of reverse osmosis apparatus assembled for separating solvent from a solution, taken along the line 3—3 in FIG. 4.

Now referring to FIG. 3, the assembled full unit 34-36 is held firmly in position by a plurality of longitudinal blocks of metal, plastic, or other firm material 37 on the tops of the flanges, and 39 on the bottom. When two full units are to be stacked in the same housing, as shown in FIG. 3, the blocks 39 become the top clamping blocks for a second unit which is clamped between its own set of bottom blocks 41 and the blocks 39. The assembly is completed by top and bottom plates 43 and 45 which bear against the adjacent blocks and are held tightly thereagainst by bolts 47 or other means, such as an hydraulic press. Shafts 32 and 32' are then withdrawn lengthwise from each unit, leaving tubes 46 for receiving solution.

It will be seen that the resulting reverse osmosis membrane tubes 46 are enclosed within a housing which is spaced therefrom to form open spaces 51, 53, and 55 for the accumulation of solvent which passes through the membranes when a solution is pumped through the tubes.

Figure 4:
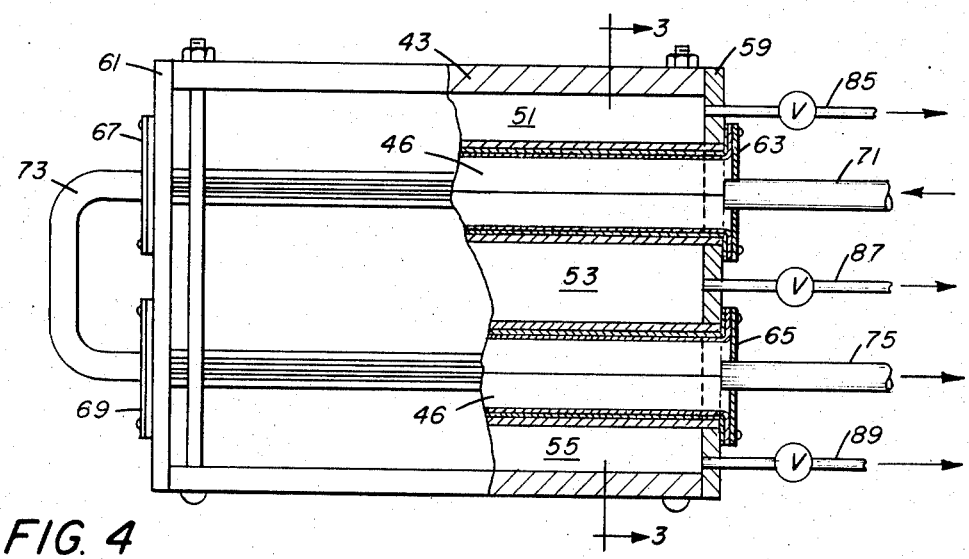
FIG. 4 is a vertical sectional view, partly in side elevation, of the assembled apparatus taken along the line 4—4 in FIG. 3.

As shown in FIG. 4, the ends of the housing can be covered with suitable end plates 59 and 61 which are bolted at their peripheries to the top and bottom members 43 and 45, and have apertures therethrough to receive protruding ends of the membrane tubes 46 which project a short distance therefrom and are turned out against the outer surfaces of the end plates to which they may be cemented with a suitable adhesive, if desired. The protruding ends of the tubes 46 are clamped fluid tightly against the outside surfaces of the end sheets by flanges 63, 65, 67, and 69 on the ends of conduits 71, 73, and 75 for conducting the solution from which solvent is to be extracted. In the modification shown, solution is pumped in through conduit 71 at high pressure, passes through a first membrane tube 46, and then through a return bend 73 and into the second membrane tube 46 from which it leaves through conduit 75. Solvent which passes through membrane tubes 46 enters spaces 51, 53, and 55 from which it is removed through valve-controlled conduits, 85, 87, and 89.

Instead of the precise arrangement shown in FIG. 4, the apparatus can be operated with each membrane tube 46 having an individual entrance and exit for solution; or a series of more than two membrane tubes can be connected together in series by return bends.

Figure 5:
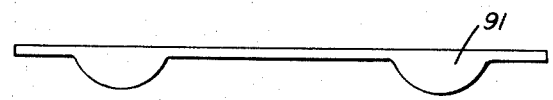
FIG. 5 is an end elevational view of a modified form of a shaft element for forming two tubular membranes.

Referring to FIG. 5, instead of employing the individual half shafts 31 and 33 as shown in FIG. 1, they can be combined into a single unitary assembly 91. This assembly, of course, must be withdrawn before sufficient clamping force has been applied to capture the assembly.

Also, it is evident that instead of using half shafts as shown in FIG. 1, each shaft can be generally cylindrical in shape and positioned on the top of the membrane 31 to press the membrane and spacer into the channels. Then the membrane and spacer of the other half unit can be laid across the protruding tops of the cylindrical shafts, after which a second half support form can be brought down into register with the first half.

Figure 6:
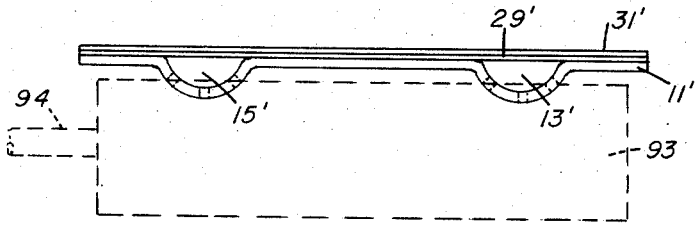
FIG. 6 is a schematic end elevational view, partly in phantom, showing an arrangement of elements for forming tubular membranes by pressure differential.

FIG. 6 shows how suction may be employed to shape the membrane. A support form 11' is positioned on the periphery of a vacuum box 93, with the membrane 31' and spacer 29' lying across the top of the support. Upon the application of a vacuum to conduit 94, the sheets are sucked down into the channels 13' and 15'. Conversely, the necessary pressure differential can be developed by positioning box 93 on the top of membrane 31' and applying air at superatmospheric pressure through conduit 94.

The invention has been described in detail with particular reference to preferred embodiments thereof, but it will be understood that variations and modifications can be effected within the spirit and scope of the invention.

We claim:

1. A method for making reverse osmosis apparatus comprising a reverse osmosis membrane tube for carrying a stream of solution, and space outside of said tube for collecting solvent which penetrates said membrane, said method comprising:

providing first and second rigid support forms, each having a relatively long and narrow perforate channel therein and flat flanges extending laterally therefrom on opposite sides of said channel, the flanges and the channels of said first and second forms being adapted to register with one another with said channels facing toward one another;

positioning two reverse osmosis membrane sheets between said support forms in contact with the respective flanges thereof and depressed into the respective channels thereof, and with the active surfaces thereof facing toward one another; clamping said flanges tightly together; and enclosing said support forms and the resulting reverse osmosis membrane tube in a housing in spaced relation thereto for collecting such solvent.

2. A method in accordance with claim 1 wherein each membrane sheet is depressed into its channel by placing shaft means on the surface thereof opposite said channel, and entering said shaft into said channel; said method also comprising withdrawing said shaft means through the end of the resulting tube after clamping said flanges together.

3. A method in accordance with claim 2 wherein a separate generally semi-cylindrical shaft is entered into each channel while said support forms are out of register, and wherein said support forms are then brought into register with one another.

4. A method in accordance with claim 2 wherein said shaft means is generally a cylinder, said method also comprising placing said cylinder on a first one of said sheets and depressing said first sheet into the channel of said first support form; placing a second one of said sheets on top of said cylinder; and then placing said second support form on said second sheet in register with said first support form.

5. A method in accordance with claim 1 wherein each membrane is depressed into its channel by applying suction to the side of said support form opposite said membrane.

6. A method in accordance with claim 1, also comprising interposing between each reverse osmosis sheet and the adjacent support form a spacer sheet of porous flexible material, said sheets also being depressed into said channels.

7. A method in accordance with claim 1 wherein said first and second rigid support forms are provided with a plurality of said channels in spaced parallel relationship and a series of said reverse osmosis membrane tubes are thus formed; said method also comprising stacking a plurality of said series of tubes in said housing.

8. Reverse osmosis apparatus comprising two rigid support forms, each having a relatively long and narrow perforate channel therein and flat flanges extending laterally therefrom on opposite sides of said channel, said channels and said flanges being in register;

two reverse osmosis membrane sheets clamped between the flanges of said support forms, each sheet extending into one of said channels and forming together a reverse osmosis tube for conducting a solution, the active surface of each such membrane being on the inside of said tube;

and a housing enclosing said support forms in spaced relation thereto for collecting solvent which penetrates the wall of said tube.

9. Reverse osmosis apparatus in accordance with claim 8 also comprising spacer sheets of porous flexible material interposed between each support sheet and the adjacent membrane.

10. Apparatus in accordance with claim 8 comprising a plurality of said tubes within said housing; means for supplying solution to and removing solution from said tubes; and means for removing solvent from the space in said housing outside of said tubes.

11. Apparatus in accordance with claim 8, also comprising means for supplying solution to an initial one of said tubes, means connecting a plurality of said tubes together end-to-end in series relationship; and means for removing solution from the final one of said tubes in said series.

12. Apparatus in accordance with claim 8 wherein said housing comprises a plurality of blocks in clamping contact with said flanges.

13. A tubular assembly for reverse osmosis apparatus, said assembly comprising two rigid support forms, each having a relatively long and narrow perforate channel therein and flat flanges extending laterally therefrom on opposite sides of said channel, said channels and said flanges being in register; and two reverse osmosis membrane sheets clamped between the flanges of said support forms, each sheet extending into one of said channels and forming together a reverse osmosis tube for conducting a solution, the active surface of each such membrane being on the inside of said tube.

14. A tubular assembly in accordance with claim 13, also comprising spacer sheets of porous flexible material interposed between each support sheet and the adjacent membrane.

* * * * *